US012796594B2

(12) United States Patent
Zhu et al.

(10) Patent No.: US 12,796,594 B2
(45) Date of Patent: Nov. 17, 2026

(54) CONTROL METHOD FOR SELF-MOVING DEVICE AND SELF-MOVING DEVICE

(71) Applicant: Suzhou Cleva Precision Machinery & Technology Co., Ltd., Suzhou (CN)

(72) Inventors: Shaoming Zhu, Suzhou (CN); Xue Ren, Suzhou (CN); Lichao Yuan, Suzhou (CN)

(73) Assignee: SUZHOU CLEVA PRECISION MACHINERY & TECHNOLOGY CO., LTD, Suzhou (CN)

( * ) Notice: Subject to any disclaimer, the term of this patent is extended or adjusted under 35 U.S.C. 154(b) by 270 days.

(21) Appl. No.: 18/745,379

(22) Filed: Jun. 17, 2024

(65) Prior Publication Data

US 2024/0415049 A1 Dec. 19, 2024

(30) Foreign Application Priority Data

Jun. 19, 2023 (CN) ........................ 202310729104.5

(51) Int. Cl.
*A01D 34/00* (2006.01)
*A01D 101/00* (2006.01)
*G06T 1/00* (2006.01)

(52) U.S. Cl.
CPC .......... *A01D 34/008* (2013.01); *G06T 1/0007* (2013.01); *A01D 2101/00* (2013.01)

(58) Field of Classification Search
CPC .............. A01D 34/008; A01D 2101/00; G06T 1/0007; G05D 1/6486; G05D 2105/15; G05D 2107/23; G05D 2109/10; G05D 2111/10; G05D 1/243
See application file for complete search history.

(56) References Cited

U.S. PATENT DOCUMENTS

| | | | | |
|---|---|---|---|---|
| 5,204,814 | A * | 4/1993 | Noonan | B60L 15/2036 701/25 |
| 12,029,156 | B1 * | 7/2024 | Simpson | A01D 34/008 |
| 2012/0158236 | A1 * | 6/2012 | Chung | A01D 34/835 701/25 |
| 2016/0174459 | A1 * | 6/2016 | Balutis | A01D 34/008 701/25 |
| 2018/0213731 | A1 * | 8/2018 | Wykman | A01C 21/007 |
| 2019/0208699 | A1 * | 7/2019 | Hasegawa | G01S 17/42 |
| 2019/0216014 | A1 * | 7/2019 | Hahn | A01D 34/008 |
| 2019/0346848 | A1 * | 11/2019 | Zhou | A01D 34/008 |
| 2020/0275605 | A1 * | 9/2020 | Chen | G01S 19/53 |
| 2021/0132213 | A1 * | 5/2021 | Advani | G01S 13/865 |

(Continued)

*Primary Examiner* — Mussa A Shaawat
(74) *Attorney, Agent, or Firm* — JK Intellectual Property Law, PA

(57) ABSTRACT

A control method for a self-moving device controls the self-moving device to move in a designated area to process a predetermined object in the designated area. The method includes steps of: obtaining, during the moving process of the self-moving device, an image of an area in a forward direction of the self-moving device; and determining, according to the image, whether the predetermined object in the area in the forward direction of the self-moving device includes a specific predetermined object, so as to control a moving direction of the self-moving device. The specific predetermined object and the predetermined object have at least one different feature parameter. A related self-moving device is also disclosed.

10 Claims, 3 Drawing Sheets

(56) References Cited

U.S. PATENT DOCUMENTS

| | | | | |
|---|---|---|---|---|
| 2021/0137006 | A1* | 5/2021 | Shearer | A01D 57/04 |
| 2023/0042867 | A1* | 2/2023 | Degnan | A01D 34/863 |
| 2023/0259138 | A1* | 8/2023 | Chen | G05D 1/0246<br>700/245 |
| 2023/0320263 | A1* | 10/2023 | Chen | A01D 34/008<br>700/245 |
| 2023/0337577 | A1* | 10/2023 | He | G05D 1/0274 |
| 2024/0248484 | A1* | 7/2024 | Frick | G01C 21/005 |
| 2026/0053086 | A1* | 2/2026 | Chen | A01D 34/008 |

* cited by examiner

CONTROL METHOD FOR SELF-MOVING DEVICE AND SELF-MOVING DEVICE

CROSS-REFERENCE TO RELATED APPLICATION

This application claims benefit of Chinese Application No. 202310729104.5, filed on Jun. 19, 2023, which is incorporated by reference herein.

TECHNICAL FIELD

Embodiments of the present disclosure relate to the technical field of path planning, in particular to a control method for a self-moving device and a self-moving device.

BACKGROUND

Visual self-moving devices do not require wiring and installation instructions, and can be used upon placement. Among visual self-moving devices, such as monocular visual robot mowers, are typically equipped with ultrasonic module to prevent collision with obstacles like hedges or flowers that are not easily recognized by a visual module. The visual self-moving devices usually adopt a random mowing mode, which has low traversal efficiency, so grass in some places is missed. However, the missed grass is high enough to be easily recognized as obstacles by ultrasonic module. Therefore, such grass will be left and gradually spread to surrounding areas.

SUMMARY

The technical problem to be solved by the present disclosure is to provide a control method for a self-moving device and a self-moving device to achieve effective and timely processing of missed grass.

To solve the above technical problem, according to one aspect of the present disclosure, a control method for a self-moving device is provided for controlling the self-moving device to move in a designated area to process a predetermined object in the designated area, including:

- obtaining, in the moving process of the self-moving device, an image of an area in a forward direction of the self-moving device; and
- determining, according to the image, whether the predetermined object in the area in the forward direction of the self-moving device includes a specific predetermined object, so as to control the moving direction of the self-moving device, where the specific predetermined object and the predetermined object have at least one different feature parameter.

According to another aspect of the present disclosure, a self-moving device is provided, including:

- a visual module;
- at least one processor; and
- a memory connected to the at least one processor by communication, where
- the memory stores a computer program that can be executed by the at least one processor, and the computer program is executed by the at least one processor, so that the at least one processor can perform the control method for a self-moving device according to any embodiment of the present disclosure.

Compared with existing technologies, in the present disclosure, an image of an area in a forward direction of the self-moving device is obtained in the moving process of the self-moving device in a designated area; and the image is processed to determine whether a predetermined object in the area in the forward direction of the self-moving device includes a specific predetermined object, and to control the self-moving device to move towards a direction in which one portion includes the specific predetermined object to process the specific predetermined object, such as cut high grass, so as to process missed grass in an effective and timely manner and prevent the missed grass from growing taller and spreading to require manual processing.

It should be understood that the content described in this section is not intended to identify key or important features of embodiments of the present disclosure, nor is it intended to limit the scope of the present disclosure. Other features of the present disclosure will be easily understood through the following description.

BRIEF DESCRIPTION OF THE DRAWINGS

In order to illustrate the technical solutions of the embodiments of the present disclosure more clearly, the accompanying drawings required for use in the embodiments will be introduced briefly below. It should be understood that the following drawings show only some embodiments of the present disclosure and therefore should not be regarded as limiting the scope, and other relevant drawings can be derived based on the accompanying drawings by those of ordinary skill in the art without any creative efforts.

DETAILED DESCRIPTION OF THE EMBODIMENTS

In order to make those skilled in the art understand the solutions of the present disclosure better, the following will clearly and completely describe the technical solutions in the embodiments of the present disclosure with reference to the accompanying drawings in the embodiments of the present disclosure. Apparently, the described embodiments are merely some rather than all of the embodiments of the present disclosure. Based on the embodiments in the present disclosure, all other embodiments obtained by those of ordinary skill in the art without any creative efforts shall fall within the scope of protection of the present disclosure.

Notably, the terms "first", "second", and the like in the description, claims, and accompanying drawings of the present disclosure are used for distinguishing similar objects and do not need to be used for describing a specific order or sequence. Understandably, the data used in such a way are interchangeable in proper circumstances, so that the embodiments of the present disclosure described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

Figure 1:
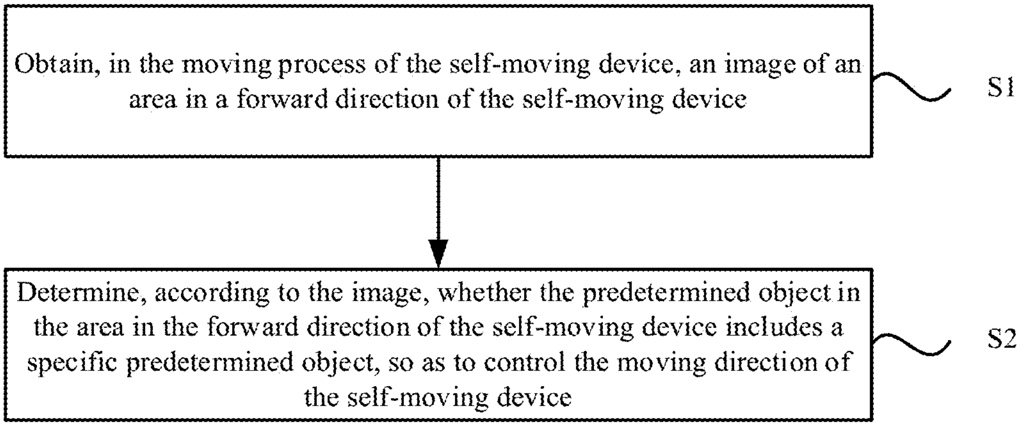
FIG. 1 is a flowchart of a control method for a self-moving device in an embodiment of the present disclosure.

FIG. 1 is a flowchart of a control method for a self-moving device in an embodiment of the present disclosure. This embodiment is applicable to a situation where the self-moving device is controlled to move in a designated area to process a predetermined object in the designated area. As shown in FIG. 1, the method specifically includes the following steps:

S1. Obtain, in the moving process of the self-moving device, an image of an area in a forward direction of the self-moving device.

In this embodiment, the self-moving device is a robot mower as an example. The designated area is an area where the robot mower needs to cut grass. The predetermined object is grass on the area where the robot mower needs to cut grass.

In this embodiment, the image is captured by a visual module on the self-moving device. The visual module on the self-moving device includes a first image module and a second image module. That is, a binocular visual module is disposed on the self-moving device in this embodiment. In the moving process of the self-moving device, a first image of the area in the forward direction of the self-moving device is obtained using the first image module, and a second image of the area in the forward direction of the self-moving device is obtained using the second image module. The images have multiple characteristics, such as hue (H), saturation(S), and value (V).

S2. Determine, according to the image, whether the predetermined object in the area in the forward direction of the self-moving device includes a specific predetermined object, so as to control the moving direction of the self-moving device, where the specific predetermined object and the predetermined object have at least one different feature parameter.

In this embodiment, the specific predetermined object is missed grass on the area where the robot mower needs to cut grass, where the missed grass is higher than surrounding grass.

Specifically, the first image and second image obtained above are processed to obtain a processed image first. Statistics on quantities of pixels with values greater than a set threshold in both the first portion and the second portion of the processed image, are collected, and whether the predetermined object includes a specific predetermined object is determined according to the statistical results. Finally, the self-moving device is controlled to move towards the direction in which one of the first portion and the second portion that includes the specific predetermined object.

The processing may include parallax processing, edge extraction, color segmentation, and the like. When it is determined that the specific object is included, the self-moving device is controlled to move directly towards the specific object for cutting or fixed-point spiral cutting.

Figure 2:
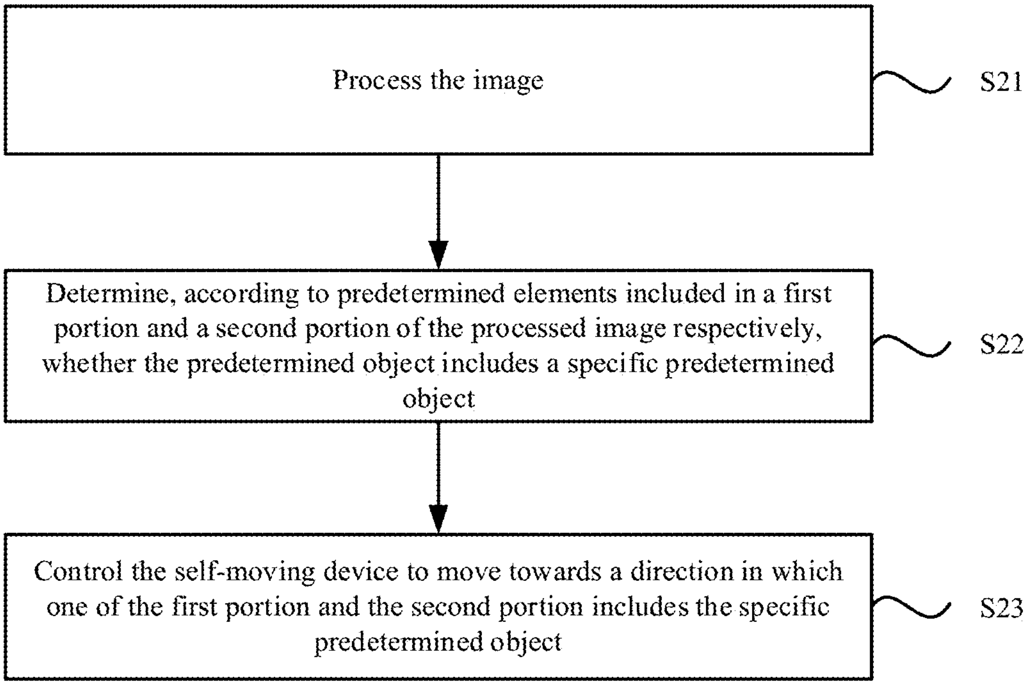
FIG. 2 is a flowchart of implementation steps of step S2 in an embodiment of the present disclosure.

FIG. 2 is a flowchart of implementation steps of step S2 in an embodiment of the present disclosure. As shown in FIG. 2, the determining, according to the image, whether the predetermined object in the area in the forward direction of the self-moving device includes a specific predetermined object, so as to control the moving direction of the self-moving device, may include the following detailed steps:

S21. Process the image.

Parallax processing, edge extraction, color segmentation, and the like are performed on the first image and the second image to obtain a processed image.

S22. Determine, according to predetermined elements included in a first portion and a second portion of the processed image respectively, whether the predetermined object includes a specific predetermined object, where the first portion and the second portion are independent of each other and have equal area.

Specifically, the first portion and the second portion may be two portions divided by a vertical centerline of the processed image as a dividing line. It can be understood that the first portion corresponds to an image on a left side in the forward direction of the robot mower, and the second portion corresponds to an image on a right side in the forward direction of the robot mower. The predetermined element includes a quantity of pixels having values greater than a set threshold. The feature parameters may be parameters of features such as color and contour. Statistics on quantities of pixels having values greater than the set threshold, included in the first portion and the second portion of the processed image respectively, are collected, and whether the predetermined object includes a specific predetermined object is determined according to the statistical results.

S23. Control the self-moving device to move towards a direction in which one of the first portion and the second portion includes the specific predetermined object.

If it is determined according to the statistical results that the predetermined object includes the specific predetermined object, that is, if it is determined according to the statistical results that there is missed grass on the area where the robot mower needs to cut grass, the self-moving device is controlled to move towards the direction in which one of the first portion and the second portion includes the specific predetermined object, that is, the robot mower is controlled to move towards missed grass.

Figure 3:
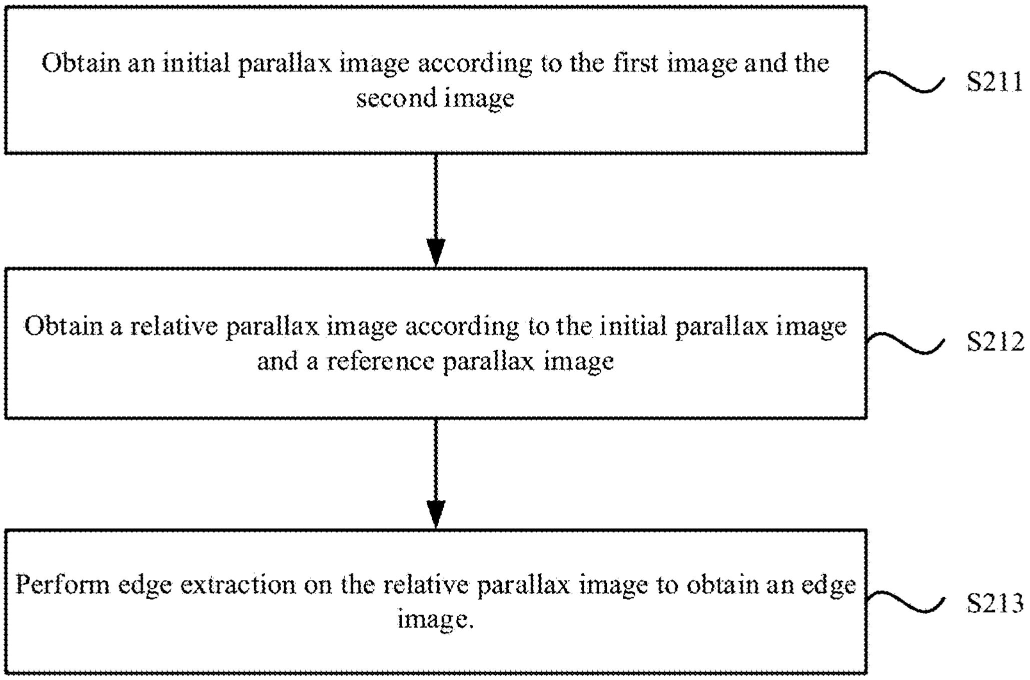
FIG. 3 is a flowchart of implementation steps of step S21 in an embodiment of the present disclosure.

FIG. 3 is a flowchart of implementation steps of step S21 in an embodiment of the present disclosure. As shown in FIG. 2, the processing the image may include the following detailed steps:

S211. Obtain an initial parallax image according to the first image and the second image.

In this step, the technical means used to obtain the initial parallax image according to the first image and the second image is a conventional technology, and will not be elaborated here.

S212. Obtain a relative parallax image according to the initial parallax image and a reference parallax image.

Specifically, the reference parallax image is first obtained, and then absolute values of differences between values of corresponding pixels in the initial parallax image and the reference parallax image are calculated to generate the relative parallax image.

The reference parallax image may be obtained by capturing, by the first image module and the second image module of the visual module, a level ground to obtain level images respectively, and then processing the level images.

S213. Perform edge extraction on the relative parallax image to obtain an edge image.

Notably, image edges are the most basic features of an image, and edges refer to image edges with abrupt changes in gray-scale information of local characteristics of the image.

Specifically, edge extraction is performed on the aforementioned relative parallax image to obtain the edge image.

Figure 4:
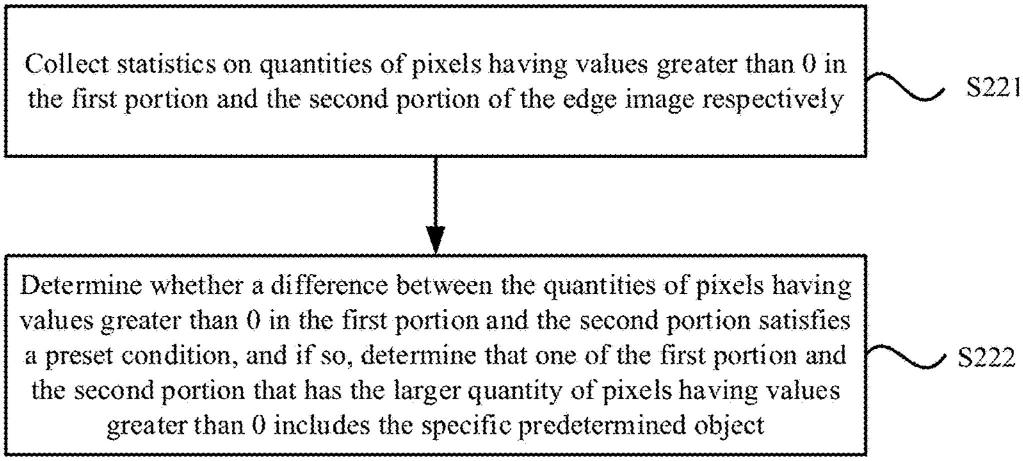
FIG. 4 is a flowchart of implementation steps of step S22 in an embodiment of the present disclosure.

FIG. 4 is a flowchart of implementation steps of step S22 in an embodiment of the present disclosure. As shown in FIG. 4, the determining, according to predetermined elements included in a first portion and a second portion of the processed image respectively, whether the predetermined object includes a specific predetermined object, may include the following detailed steps:

S221. Collect statistics on quantities of pixels having values greater than 0 in the first portion and the second portion of the edge image respectively, where the first portion and the second portion are symmetrical about a center of the edge image.

S222. Determine whether a difference between the quantities of pixels having values greater than 0 in the first portion and the second portion satisfies a preset condition, and if so, determine that one of the first portion and the second portion that has the larger quantity of pixels having values greater than 0 includes the specific predetermined object. The preset condition is as follows: the quantity of pixels in one of the first portion and the second portion that has the larger quantity of pixels having values greater than 0 is a preset multiple of the quantity of pixels in the other of the first portion and the second portion that has the smaller quantity of pixels having values greater than 0.

Specifically, the edge image is the aforementioned processed image, and statistics on the quantities of pixels having values greater than 0 in the first portion and the second portion of the edge image are collected respectively, where the first portion and the second portion may be divided by the vertical centerline of the processed image as a dividing line, and the first portion and the second portion are symmetrical about the center of the edge image. If the quantity of pixels in one of the first portion and the second portion that has the larger quantity of pixels having values greater than 0 is the preset multiple of the quantity of pixels in the other of the first portion and the second portion that has the smaller quantity of pixels having values greater than 0, it is determined that one of the first portion and the second portion that has the larger quantity of pixels having values greater than 0 includes the specific predetermined object. The preset multiple may be 1.5 times.

Figure 5:
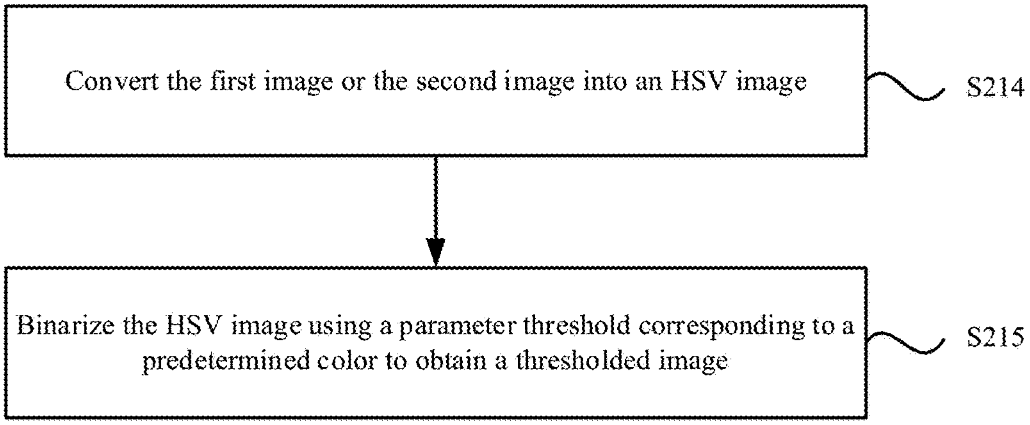
FIG. 5 is a flowchart of obtaining a thresholded image in an embodiment of the present disclosure.

FIG. 5 is a flowchart of obtaining a thresholded image in an embodiment of the present disclosure. As shown in FIG. 5, the processing the image further includes the following steps:

S214. Convert the first image or the second image into an HSV (Hue, Saturation, Value) image.

In this step, any one of the first image or the second image is first converted into an HSV image.

S215. Binarize the HSV image using a parameter threshold corresponding to a predetermined color to obtain a thresholded image, where the predetermined color is consistent with a color of the predetermined object.

Specifically, the color of the predetermined object may be a green color of lawn grass, and the predetermined color consistent with the color of the predetermined object is also a green color. The parameter threshold corresponding to the color consistent with the color of the predetermined object is obtained, and then the HSV image is binarized based on the parameter threshold to obtain the thresholded image, where the values of pixels at the parameter threshold become 255, and the values of remaining pixels become 0.

Figure 6:
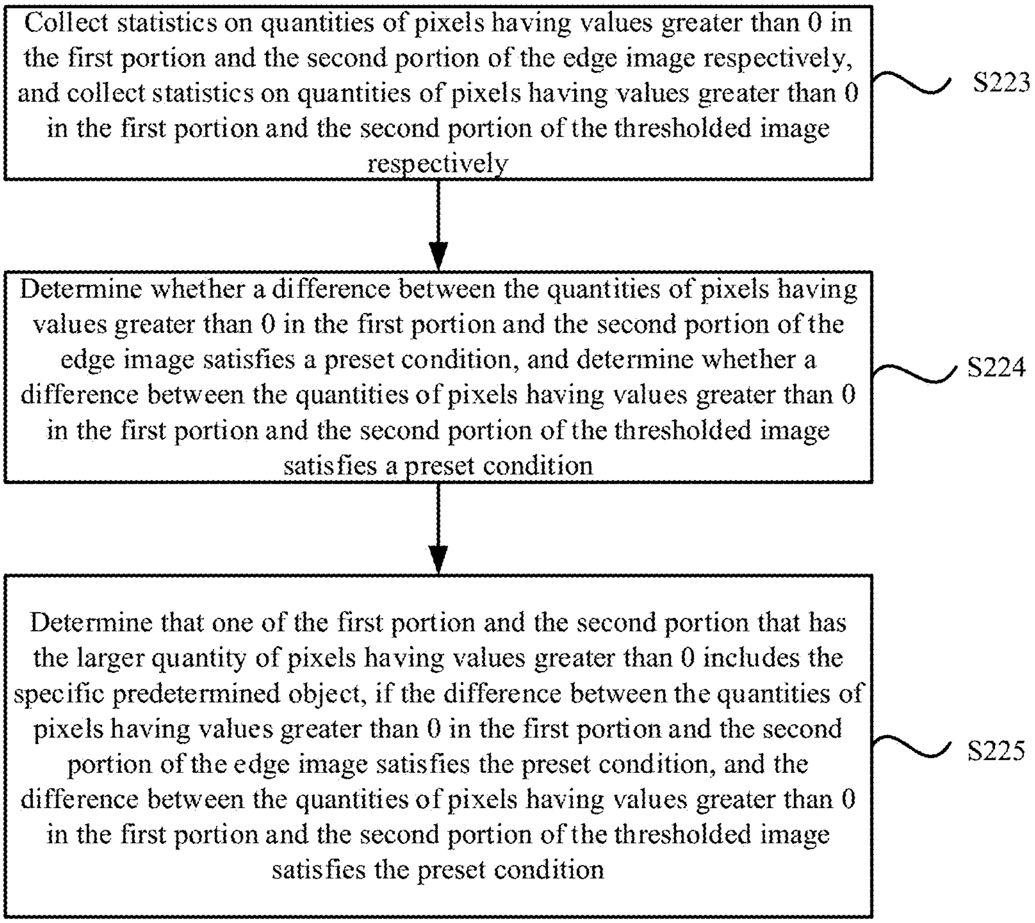
FIG. 6 is another flowchart of implementation steps of step S22 in an embodiment of the present disclosure.

FIG. 6 is another flowchart of implementation steps of step S22 in an embodiment of the present disclosure. As shown in FIG. 6, the determining, according to predetermined elements included in a first portion and a second portion of the processed image respectively, whether the predetermined object includes a specific predetermined object, may include the following detailed steps:

S223. Collect statistics on quantities of pixels having values greater than 0 in the first portion and the second portion of the edge image respectively, and collect statistics on quantities of pixels having values greater than 0 in the first portion and the second portion of the thresholded image respectively.

Specifically, first of all, both the edge image and the thresholded image may be used as the aforementioned processed image. Then, each image is divided into two portions according to the vertical centerline as a dividing line, the portions on the same side are regarded as a group, and the whole is divided into a first portion and a second portion.

Statistics on the quantities of pixels having values greater than 0 in the first portion and the second portion of the edge image are collected, and statistics on the quantities of pixels having values greater than 0 in the first portion and the second portion of the thresholded image are collected, respectively.

S224. Determine whether a difference between the quantities of pixels having values greater than 0 in the first portion and the second portion of the edge image satisfies a preset condition, and determine whether a difference between the quantities of pixels having values greater than 0 in the first portion and the second portion of the thresholded image satisfies a preset condition.

The preset condition is as follows: the quantity of pixels in one of the first portion and the second portion that has the larger quantity of pixels having values greater than 0 is a preset multiple of the quantity of pixels in the other of the first portion and the second portion that has the smaller quantity of pixels having values greater than 0.

S225. Determine that one of the first portion and the second portion that has the larger quantity of pixels having values greater than 0 includes the specific predetermined object, if the difference between the quantities of pixels having values greater than 0 in the first portion and the second portion of the edge image satisfies the preset condition, and the difference between the quantities of pixels having values greater than 0 in the first portion and the second portion of the thresholded image satisfies the preset condition.

It is determined that one of the first portion and the second portion that has the larger quantity of pixels having values greater than 0 includes the specific predetermined object, if the difference between the quantities of pixels having values greater than 0 in the first portion and the second portion of the edge image satisfies the preset condition, and the difference between the quantities of pixels having values greater than 0 in the first portion and the second portion of the thresholded image satisfies the preset condition.

According to the technical solutions of the embodiments of the present disclosure, an image of an area in a forward direction of the self-moving device is obtained in the moving process of the self-moving device; and whether a predetermined object in the area in the forward direction of the self-moving device includes a specific predetermined object is determined according to the image to control the moving direction of the self-moving device to process the specific predetermined object, such as cut high grass, so as to process missed grass in an effective and timely manner and prevent the missed grass from growing taller and spreading to require manual processing.

Figure 7:
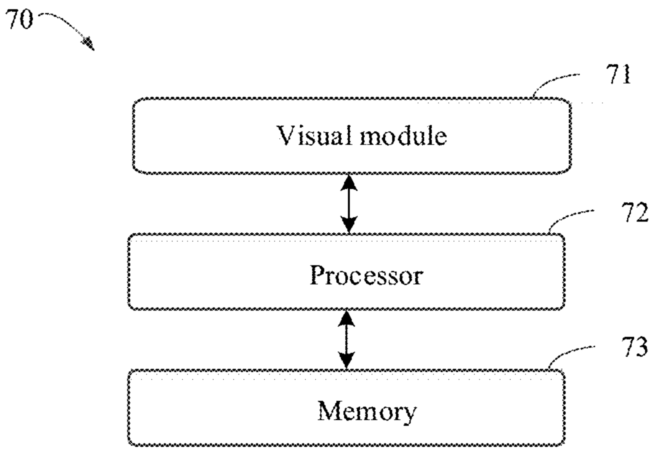
FIG. 7 is a schematic structural diagram of a self-moving device implementing the embodiments of the present disclosure.

FIG. 7 shows a schematic structural diagram of a self-moving device 70 that can be used to implement the embodiments of the present disclosure. The self-moving device 70 is designed to represent various forms of self-moving apparatuses, such as a robot mower. The components shown herein, their connections and relationships, and their functions are merely examples, and are not intended to limit the implementation of the present disclosure described and/or required herein.

As shown in FIG. 7, the self-moving device 70 includes a visual module 71, at least one processor 72, and a memory 73 connected to the at least one processor 72 by communication, where the visual module 71 can obtain image information in a forward direction of the self-moving device 70, and the processor 72 can perform various methods and processes described above, such as the control method for a self-moving device:

- obtaining, in the moving process of the self-moving device, an image of an area in the forward direction of the self-moving device; and
- determining, according to the image, whether a predetermined object in the area in the forward direction of the self-moving device includes a specific predetermined object, so as to control the moving direction of the self-moving device, where the specific predetermined object and the predetermined object have at least one different feature parameter.

It should be understood that steps may be reordered, added, or deleted based on various forms of procedures shown above. For example, the steps described in the present application may be performed in parallel, sequentially, or in different orders. As long as the results desired by the technical solutions of the present disclosure can be achieved, no limitation is imposed herein.

The aforementioned specific implementations do not constitute a limitation on the scope of protection of the present disclosure. Those skilled in the art should understand that various modifications, combinations, sub-combinations, and replacements may be conducted according to design requirements and other factors. Modifications, equivalent replacements, improvements, and the like made within the spirit and principle of the present disclosure shall fall within the scope of protection of the present disclosure.

The invention claimed is:

1. A method for controlling a self-moving device to move in a designated area based on a visual processing of a predetermined object in the designated area, the method comprising the steps of:

- obtaining, during moving of the self-moving device in the designated area, an image of an area in a forward direction of the self-moving device, the image including the predetermined object; and
- determining, according to the image, whether the predetermined object in the image includes a specific predetermined object, so that if the specific predetermined object is determined to be included in the image a moving direction of the self-moving device is controlled to be towards the specific predetermined object, wherein:
- the self-moving device is a robot mower for cutting grass;
- the designated area is a space including grass to be cut during a mowing session;
- the predetermined object is grass within the designated area;
- the specific predetermined object is grass within the designated area that has not been cut by the robot mower during the mowing session; and
- wherein the grass within the designated area that has not been cut by the robot mower during the mowing session has a first height and the grass within the designated area that has been cut by the robot mower during the mowing session has a second height less than the first height.

2. The control method according to claim 1, wherein the step of determining, according to the image, whether the predetermined object in the image includes a specific predetermined object, includes:

- processing the image to obtain a processed image and determining, according to predetermined elements included in a first portion and a second portion of the processed image respectively, whether the predetermined object includes the specific predetermined object, wherein the first portion and the second portion of the processed image are independent of each other and have equal area.

3. The control method according to claim 2, wherein the step of obtaining, during moving of the self-moving device in the designated area, an image of an area in a forward direction of the self-moving device includes:

- obtaining, during moving of the self-moving device, a first image of the area in the forward direction of the self-moving device using a first image module and a second image of the area in the forward direction of the self-moving device using a second image module.

4. The control method according to claim 3, wherein the step of processing the image to obtain a processed image includes the steps of:

- obtaining an initial parallax image according to the first image and the second image;
- obtaining a relative parallax image according to the initial parallax image and a reference parallax image; and
- performing edge extraction on the relative parallax image to obtain an edge image.

5. The control method according to claim 4, wherein the step of determining, according to predetermined elements included in a first portion and a second portion of the processed image respectively, whether the predetermined object includes the specific predetermined object, includes the steps of:

- collecting statistics on quantities of pixels having values greater than 0 in a first portion and a second portion of the edge image respectively, wherein the first portion and the second portion of the edge image are symmetrical about a center of the edge image; and
- determining whether a difference between the quantities of pixels having values greater than 0 in the first portion and the second portion of the edge image satisfies an edge preset condition, and if so, determining that the one of the first portion and the second portion of the edge image that has a larger quantity of pixels having values greater than 0 includes the specific predetermined object.

6. The control method according to claim 4, wherein the processing the image to obtain a processed image includes the steps of:

- converting the first image or the second image into an HSV image; and
- binarizing the HSV image using a parameter threshold corresponding to a predetermined color to obtain a thresholded image, wherein the predetermined color is consistent with a color of the predetermined object.

7. The control method according to claim 6, wherein the step of determining, according to predetermined elements included in a first portion and a second portion of the processed image respectively, whether the predetermined object includes the specific predetermined object, includes the steps of:

collecting statistics on quantities of pixels having values greater than 0 in the first portion and the second portion of the edge image respectively, and collecting statistics on quantities of pixels having values greater than 0 in the first portion and the second portion of the thresholded image respectively;

determining whether a difference between the quantities of pixels having values greater than 0 in the first portion and the second portion of the edge image satisfies an edge preset condition, and determining whether a difference between the quantities of pixels having values greater than 0 in the first portion and the second portion of the thresholded image satisfies a threshold preset condition; and determining that the one of the first portion and the second portion of the processed image that has the larger quantity of pixels having values greater than 0 includes the specific predetermined object, if the difference between the quantities of pixels having values greater than 0 in the first portion and the second portion of the edge image satisfies the edge preset condition, and the difference between the quantities of pixels having values greater than 0 in the first portion and the second portion of the thresholded image satisfies the threshold preset condition.

8. The control method according to claim 5, wherein the preset condition is as follows:

the quantity of pixels in the one of the first portion and the second portion of the edge image that has the larger quantity of pixels having values greater than 0 is a preset multiple of the quantity of pixels in the other of the first portion and the second portion of the edge image that has the smaller quantity of pixels having values greater than 0.

9. The control method according to claim 5, wherein the method includes:

controlling the self-moving device to move towards a direction in which one of the first portion and the second portion of the edge image includes the specific predetermined object.

10. A self-moving device comprising:

a visual module;

at least one processor; and a memory connected to the at least one processor by communication, wherein the memory stores a computer program that can be executed by the at least one processor, and the computer program is executed by the at least one processor, so that the at least one processor can perform the control method according to claim 1.

* * * * *